United States Patent [19]

Loftus et al.

[11] Patent Number: 4,740,349
[45] Date of Patent: Apr. 26, 1988

[54] MACHINE IMPLEMENTED SYSTEM FOR DETERMINING COMPLIANCE OF A COMPLEX PROCESS PLANT WITH TECHNICAL SPECIFICATIONS

[75] Inventors: Michael J. Loftus, Murrysville Boro; Nicholas J. Liparulo, North Huntingdon; Donald P. Remlinger, Jr., Brentwood, all of Pa.

[73] Assignee: Westinghouse Electric Corp., Pittsburgh, Pa.

[21] Appl. No.: 913,045

[22] Filed: Sep. 29, 1986

[51] Int. Cl.$^4$ .............................. G21C 7/36
[52] U.S. Cl. ...................... 376/216; 376/259; 364/140
[58] Field of Search ............... 376/216, 215, 217, 245, 376/259; 364/138, 140, 148, 550

[56] References Cited

U.S. PATENT DOCUMENTS 4,552,718 11/1985 Impink et al.
4,632,802 12/1986 Herbst .............................. 376/216

OTHER PUBLICATIONS

Computerized Technical Specification Compliance Specappraisal, M. J. Loftus and N. J. Liparulo, Jan. 1985, ANS Conference—Boston.
Nucleonics Week—Sep. 6, 1984—Orders Seen Soon for LCO Tracking Systems in Desktop Computers.
User Confidence in Computer-Aided Technical Specification Management, R. G. Sider, P. W. Rzasa, S. A. Serafin, Combustion Engineering, Inc., Windsor Connection.
Quantus—Quadrex Nuclear Technical Specification User System.
Nuclear News—Sep. 1984—The Onset of Computer-Based Systems—Technical Specifications.
Computerizing the Plant Specifications—Robert F. Renuart.

Primary Examiner—Donald P. Walsh
Attorney, Agent, or Firm—D. C. Abeles

[57] ABSTRACT

Components and systems which impact technical specifications (tech specs) in a nuclear power plant are modeled in a set of cascading operability trees which represent the various combinations of component, system and parameter statuses which can result in non-compliance with the tech specs. Cutsets for the operability trees are entered into a cutset table in the data base of a digital computer which tracks the effect of a selected event up through the trees by repetitively searching the cutset table using the top event activated by the selected event as the selected event for the next search, until an activated top event is reached which is not entered in the cutset table as an event. A separate cutset evaluation table is used to assure that all the members of a multiple event cutset have been activated before the associated top event is activated. The base events which resulted in activation of a top event, such as non-compliance with a tech spec, can be identified by reversing the search process down through the cutsets in the cutset table.

18 Claims, 12 Drawing Sheets

FIG. 9.

| PLANT MODE: N<br>PLANT MODE NAME<br>(DATA INPUT) | | PLANT NAME<br>SPECAPPRAISAL<br>RESULTS | | CURRENT RATE<br>CURRENT TIME | |
|---|---|---|---|---|---|
| IMPACTED<br>LCO/ACTION NO. | STATUS | IMPACTED<br>SYSTEM | STATUS | MODE |
| 3.7.3 | NOT MET | CCW TRAIN A | NOT OPERABLE | 1 |
| 3.7.3 | VIOLATED | CCW TRAIN B | NOT OPERABLE | 1 |

| PLANT MODE: N | PLANT NAME | CURRENT RATE |
| --- | --- | --- |
| PLANT MODE NAME | SPECAPPRAISAL | CURRENT TIME |
| (RESULTS) | SYSTEM OPERABILITY | |

| SYSTEM: CCW TRAIN A | STATUS: NOT OPERABLE | DATE/TIME: MM/DD/YY HH:MM |
| --- | --- | --- |

ITEMS RENDERING SYSTEM INOPERABLE

| ITEM | DESCRIPTION | STATUS | STATUS DATE/TIME |
| --- | --- | --- | --- |
| EG-HV-0053 | HAND CONTROL VALVE | OUT OF SERV CLS | MM/DD/YY HH:MM |

| PLANT MODE: N<br>PLANT MODE NAME<br>(MAIN MENU) | PLANT NAME<br>SPECAPPRAISAL<br>LCO DATA | | CURRENT RATE<br>CURRENT TIME | |
|---|---|---|---|
| LCO/ACTION NO. | STATUS | STATUS DATE/TIME |
| 3.7.3. | NOT MET | MM/DD/YY HH:MM |
| SYSTEM DESCRIPTION | STATUS | STATUS DATE/TIME |
| CCW TRAIN A<br>CCW TRAIN B | NOT OPERABLE<br>OPERABLE | MM/DD/YY HH:MM<br>MM/DD/YY HH:MM |

MACHINE IMPLEMENTED SYSTEM FOR DETERMINING COMPLIANCE OF A COMPLEX PROCESS PLANT WITH TECHNICAL SPECIFICATIONS

BACKGROUND OF INVENTION

1. Field of Invention

This invention relates to a method and apparatus for machine implemented analysis of the effects of various events upon the compliance of a complex process plant with technical specifications. More particularly, it relates to a method and apparatus which combines fault tree analysis with efficient data base management techniques and man-machine interface design to determine compliance with limiting conditions of operation and system operability in such complex processes as nuclear power plants.

2. Background Information

As technological advances produce more complex automated processes, the burden placed upon the operator in monitoring and managing such processes, especially under abnormal conditions, has become increasingly heavier. Consequently, it has become ever more important that the operator be provided with adequate information to make informed decisions in a form which is easily understandable, even under conditions of stress which might arise with the occurrence of an unexpected event.

A typical complex automated process is a nuclear power plant. The operation of such plants is governed by very strict regulatory requirements including compliance with technical specifications (tech specs). These tech specs are designed to assure that nuclear plant operations are consistent with, and supported by, the plant safety analysis. In other words, they define an envelope in which the plant should be operated so as to assure public safety. However, the tech specs have evolved into what is today a very complex set of requirements that may be difficult to interpret and manage proficiently. In addition, the tech specs contain poorly identified, interrelated requirements which may lead to unintentional noncompliance with the provisions of one spec when responding to another.

There is a definite need therefore, for a system which will aid the plant operator in assuming compliance with the tech specs. This includes aid in determining compliance with limiting conditions of operations (LCOs) and determining the operability of certain systems. It is also important for the operator to be aware of the events which resulted in non-compliance with an LCO or the inoperability of a system.

Accordingly, it is a primary object of the invention to provide a method and apparatus for aiding the operator of a complex process plant in assuring compliance of the operation of the plant with technical specifications, including in the case of a nuclear power plant, limiting conditions of operation.

It is another object of the invention to provide such a method and apparatus which takes into account the affects of the inoperability of a component or system on multiple technical specifications;

It is still another object of the invention to satisfy the previous objects with a method and apparatus which utilizes operability trees to determine compliance with technical specifications and the operability of systems;

it is yet another object of the invention to satisfy the latter object with a computer based method and apparatus which utilizes efficient data base management techniques to search the thousands of cutsets in the operability trees required for a complex process plant, including techniques to reduce the processing time required to find all the members of multiple event cutsets.

It is also an object of the invention to provide a method and apparatus in accordance with the previous objects which is capable of generating for the user an output identifying the events which led to a non-compliance with tech specs.

SUMMARY OF THE INVENTION

These and other objects are realized by the invention which utilizes operability tree logic combined with efficient data base management techniques and user friendly computer displays to provide real-time, machine implemented analysis of tech spec compliance down to the component level in a complex process plant.

The operability trees are designed to model the plant systems and components whose operability is important to satisfy the requirements of the tech specs, and to provide consistent tech spec interpretation. These trees depict the combinations of component and parameter states which can lead to an undesired top event, generally an out of compliance LCO condition or an inoperable system. In order to provide information on intermediate systems, the trees can be broken down into smaller trees with the top event in the lower trees, usually representing the operability of a subsystem, serving as inputs to the next higher level trees.

The operability tree logic is incorporated into the data base of a programmed digital computer as a series of cutsets, some of which are multiple event cutsets requiring the occurrence of more than one event to activate the top event of the tree. The cutset information is arranged in the data base in a cutset table which includes an event attribute identifying the input and a top level attribute identifying the event at the top of the tree activated by the cutset. For a given event, the computer searches the event attributes of the cutset table for the selected event to identify as activated all cutsets for which the selected event activates the top event of the tree. As to each such activated cutset, the computer repeats the above search using the activated top event attribute of the activated cutset as the selected event. The process continues in this manner up through the trees until an activated top event does not appear as an event attribute in the cutset table. Such an event is an ultimate top event, such as a limiting condition of operation (LCO) in a nuclear power plant.

For multiple event cutsets, a separate entry is placed in the cutset table for each member of the cutset with a common cutset identifier attribute, and with a cutset type attribute identifying it as a member of a multiple event cutset. When a search of the cutset table produces an event associated with a multiple event cutset, as indicated by the cutset type attribute, a search is made for the other members of the multiple event cutset before the top event is identified as activated. This is accomplished by generating a cutset evaluation table having an entry for each multiple event cutset which includes a counter which counts the number of members of the cutset which have been activated. Preferably, the counter is set to the number of members in the multiple event cutset and is decremented by one as each member is activated so that the top event is activated when the count reaches zero. As members of the multiple event cutset are returned to operability, the counter is incremented by one.

As another aspect of the invention, the base events which led to the activation of an ultimate top level event, such as non-compliance with an LCO in a nuclear power plant, can be determined by searching the cutset table for the cutsets in which that event is the top event. The event from such a cutset is then used as the top event in another search through the cutset table. This process continues until an event is reached which does not appear as a top event in the cutset table. Such an event is at the bottom of the tree structure and is displayed to the user as an event which triggered the ultimate top event.

The invention, which encompasses both the method and apparatus for determining compliance with tech specs and system operability, provides an efficient real-time system, even for a plant having hundreds of tech specs which produce many thousands of cutsets when modeled in operability trees.

The invention also has broad applicability as a machine implemented method for determining activation of a top event in a decision tree.

BRIEF DESCRIPTION OF DRAWINGS

A full understanding of the invention can be gained from the following description of the preferred embodiments when read in conjunction with the accompanying drawings in which:

FIG. 9 is an illustration of a display screen presenting the results of an LCO compliance evaluation in accordance with the invention;

FIG. 10 is an illustration of a display screen presenting the components which have caused non-compliance with an LCO;

FIG. 11 is an illustration of a display screen presenting the status of the top level events that impact a particular LCO.

DESCRIPTION OF THE PREFERRED EMBODIMENT

The invention will be described as applied to a presurized water reactor nuclear power plant, but it is to be understood that it is also suitable for use in connection with other types of complex process plants.

Figure 1:
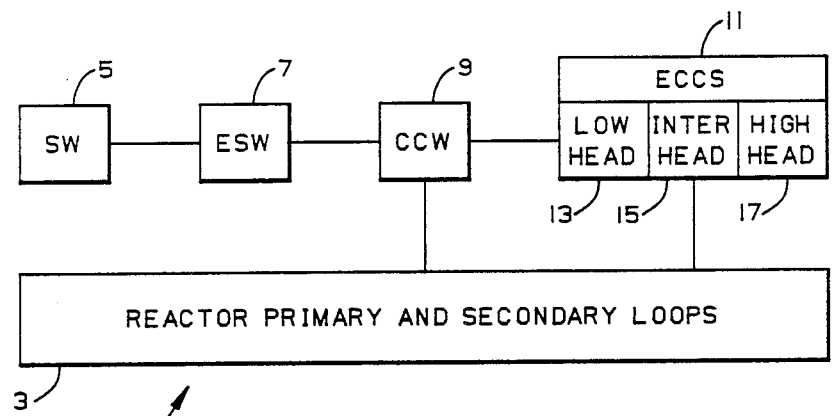
FIG. 1 is a schematic diagram of a PWR nuclear power plant to which the invention is applied showing the relationship of certain of the water systems.

The relationships of certain systems in a PWR useful in understanding the present invention are represented schematically in FIG. 1. The nuclear power plant 1 represented in FIG. 1 includes the PWR primary and secondary loops 3, the operation of which is well understood. Essential to the operation of the plant are a number of water systems which include the service water system (SWS) 5. The SWS is a non-safety related system which provides a source of heat rejection for plant auxiliaries which require cooling during normal plant operation and normal plant shutdown.

The SWS also supplies cooling water to the safety-related essential service water system (ESWS) 7 during normal operation. The ESWS 7, which consists of two redundant cooling water trains A and B, removes heat from plant components which require cooling for safe shutdown of the reactor or following a D B A. The ESWS 7 also provides emergency makeup water for, among other systems, the component cooling water systems (CCWS) 9.

The CCWS 9 is a cooling system for reactor auxiliaries. It supplies cooling water to selected auxiliary components during normal plant operation, including shutdown, and also provides cooling water to several engineered safety feature systems during certain abnormal conditions. The CCWS 9 is a closed loop system which serves as an intermediate barrier between the SWS 5 or ESWS 7 and potentially radioactive systems in order to eliminate the possibility of an uncontrolled release of radioactivity. It consists of two separate 100 percent capacity trains A and B which serve engineered safety features, and includes a loop, common to and isolatable from both trains, which serves the nonessential equipment.

The Emergency Core Cooling System (ECCS) 11 cools the reactor core and provides additional shutdown capability following a loss of fluid event from either the primary or secondary loops 3. It includes a low head section 13, an intermediate head section 15 and a high head section 17.

These water systems include numerous pumps, valves of various types, tanks, heat exchangers, interconnecting pipes and instrumentation, many of which are arranged in redundant trains. It is apparent from the above description, that these systems are interrelated such that the inoperability of a component or subsystem in one of these water systems can have a cascading affect upon the operation of other systems. While these particular systems have been mentioned specifically for purpose of demonstration, it can be appreciated that other components and systems throughout the plant are likewise interrelated, and in fact, that inoperability of certain of the systems and components in these water systems will have an affect on the operability of other systems in the plant.

It is this interaction of the various system and their compounding effect as plants have become more complex, which have complicated the task of maintaining compliance with the plant technical specification or tech specs.

As mentioned above, the purpose of the nuclear power plant tech specs is to impose requirements on the plant operation such that the evaluated safety analysis basis of the plant is maintained. The tech specs, which are issued as Appendix A to each operating license, are comprised of two parts:

(1) Limiting Conditions of Operations (LCOs), and
(2) Surveillances.

The LCO's are the "rules" to which the plant operations staff must adhere in operating the plant. These rules often state that particular safety systems or equipment shall be operable during various modes of plant operation, i.e., as a function of reactor temperature and power. The Surveillances are testing requirements which are performed on a periodic basis to ensure that the LCO's are met. If a surveillance fails, there are specified actions which must be followed in specified time frames until the surveillance is performed satisfactorily.

However, there is also other maintenance being continuously performed in the plant on the systems and equipment which are covered by the tech specs. It is of the utmost importance to know what equipment will impact which LCO's and the action time limits prior to initiating this maintenance, i.e., how long can this equipment be maintained out of service for the associated maintenance work before the plant must be reduced in power and/or temperature.

Of course, due to the large quantity and complexity of the plant tech specs, there can be different interpretations by the operations staff of what was meant or intended by a particular LCO requirement in various plant situations.

The system which incorporates the subject of this invention was developed to uncomplicate the task of maintaining compliance with the tech specs for the operations staff. It is a computer based system which performs several functions. The invention is focused on an LCO compliance checking function which enables personnel to consistently determine if systems and equipment that are out of service, or parameters that are out of spec, have an impact on the LCO's relative to the plant mode of operation.

The LCO compliance checking function is comprised of the following three key elements:

(1) Operability Trees which provide the data relationships between the plant equipment and the LCO's.

(2) Data base and software which provide the mechanism to store the data and perform the compliance evaluation.

(3) Computer screens which provide the interface for the user to interactively request the evaluation and review the results.

Each of these key elements are described in detail in the following three subsections.

1. Operability Trees

The Operability Trees are similar to fault trees commonly used in Probalistic Risk Analyses (PRA). However, these Operability Trees are strictly deterministic and require no probabilistic data base for system or equipment failures. An Operability Tree is a deductive tool by which an undesired plant condition such as an LCO noncompliance or system inoperability is specified. A methodical analysis is performed to determine all credible system and component states which may lead to that condition. The tree itself is a graphic model of various parallel and sequential combinations of events and is comprised of various gates which either permit or inhibit the passage of fault logic up the tree. The Operability Tree thus depicts the logical interrelationships of basic events such as equipment states that lead to the undesired event at the top of the tree such as LCO noncompliance.

Operability trees development begins with a detailed interpretation of the tech specs. The interpretation includes defining system and subsystem boundaries, interpreting "operability" in terms of components and parameters and their states, and support system requirements. Tech spec interpretation is the most important step in the operability tree development process and will consider the following factors:

1. The intention of the spec with respect to the minimum system, subsystem or component safety-related performance requirements.
2. An understanding of how the systems interact from a safety point of view.
3. The set of parameters, features, conditions and time responses required for system operability, both normally and in response to safety-related transients.
4. Functional requirements for supporting systems.
5. Cascading tech specs, i.e., the relationship between tech specs.
6. Definition of system boundaries
7. Establishment of a level of detail or level of resolution for the modeling of each system, subsystem or component.

An operability tree is a logic model which graphically depicts how a top event, generally an out-of-compliance LCO or inoperable system, can occur. The operability tree displays the combinations of component and parameter states which may result in the undesired top condition. It is a method of systematically analyzing and displaying the inter-relations among these basic events and the top event, often through intermediate events. Operability tree development is performed in accordance with a set of Operability Tree Guidelines established for each project. These guidelines include, for example, a definition of component states to be used in the modeling. These component states are defined to maximize consistency with the tag-out system currently in use.

After establishing the operability tree logic, the information contained in the model is extracted and incorporated into the "operability tree" data base. Boolean algebra is used to "quantify" or determine the "cutsets". The cutsets are the combinations of basic events or component states which, when occurring together, cause the undesired top event. The complete set of cutsets provides all of the ways the top event can occur and builds the operability tree data base.

Figure 2:
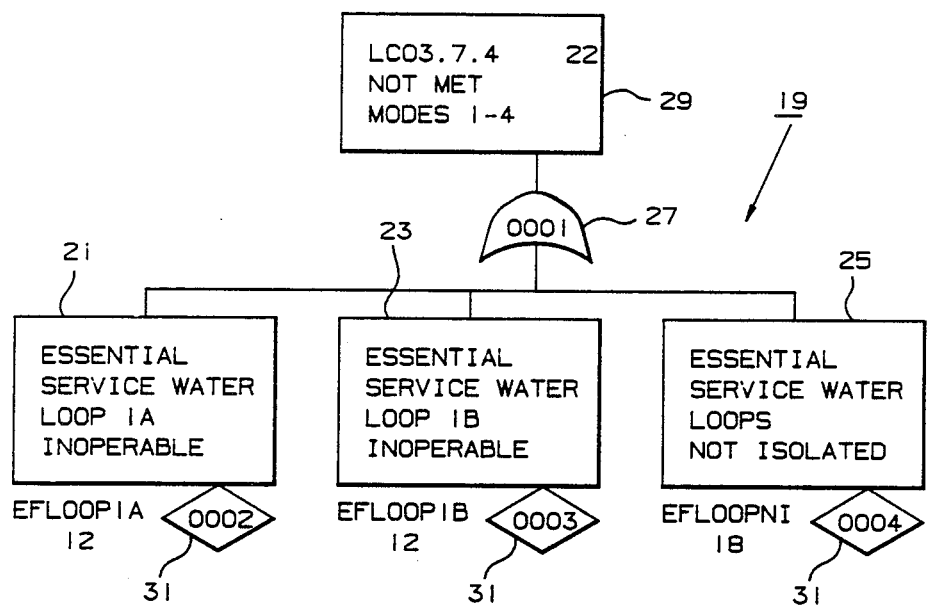

An exemplary set of operability trees is shown in FIG. 2 through 6 for three LCOs and two systems. FIG. 2 illustrates a tree 19 for determining compliance with LCO 3.7.4. The requirements for this LCO are stated very simply:

LCO 3.7.4 At least two independent essential service water (ESW) loops shall be OPERABLE.

FIG. 2 illustrates that any one of three lower level events 21, 23, 25 connected by an OR gate 27 will make LCO 3.7.4, 29, NOT MET. For purposes of the invention, inoperability of a system or component, a parameter which is out of spec, or an LCO which is not met are all considered events. An event which is at the top of a tree, such as 29 in FIG. 2, is a top event. In the tree of FIG. 2, the occurrence of any one of the events, Essential Service Water Loop 1A INOPERABLE 21, Essential Service Water Loop 1B INOPERABLE 23, or Essential Service Water Loops NOT ISOLATED 25, results in the occurrence of the top event LCO 3.7.4 NOT MET 29.

For purposes of identification and manipulation of the trees in the data base, each event is given an identifier which is shown below the block in FIG. 2. For instance, Essential Service Water Loop 1A is identified by the symbol EFLOOP1A and a number, "12", the latter indicating the status, in this case, NOT OPERABLE, which will activate the top event in the tree. The status of the Essential Service Water Loops EFLOOPNI, which will activate the top event is NOT ISOLATED, represented by the code "18". The activated status of the top event is also represented by a numerical code shown within the upper right hand corner of the box, for instance "22" meaning NOT MET in the case of LCO 3.7.4.

Figure 3:
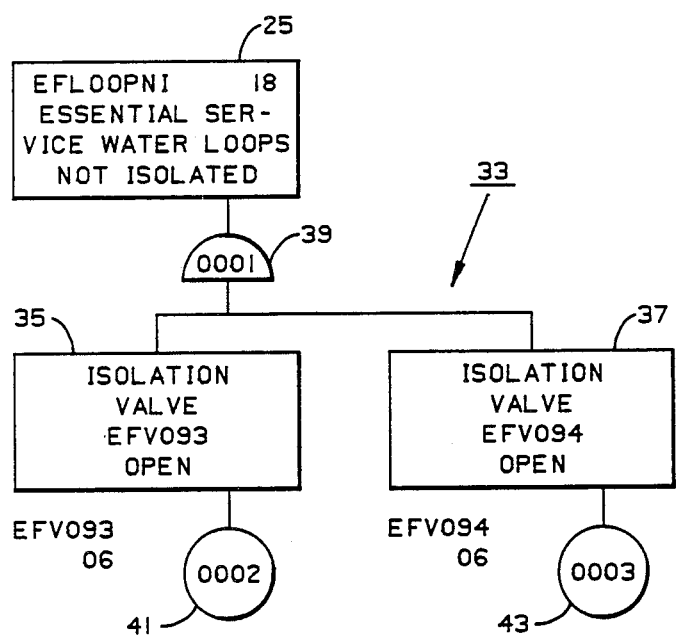
FIGS. 2 through 6 are exemplary operability trees in accordance with the invention for certain of the technical specifications for the water systems shown in FIG. 1.

The "diamond" symbols 31, below each of the three events 21, 23 and 25 indicate that those events are developed in another tree. For instance, FIG. 3 illustrates the tree 33 for event 25, Essential Service Water Loops NOT ISOLATED. This event, which is the top event for this tree 33, is activated by two events 35 and 37 connected by AND gate 39. Thus, both these events, Isolation valve EFV093 OPEN 35, and Isolation Valve EFV094 OPEN 37 must occur for the top event 25 to be activated. Therefore, there is only one path by which the tree 33 can be activated, but it is a multiple event path requiring the occurrence of events 35 and 37.

The "circle" symbols 41 and 43 below the events 35 and 37 respectively indicate that these events occur at the component level. In this case the components are isolation valves, and the status "6" of the valves which activates the top event is IN SERVICE OPEN.

Figure 4:
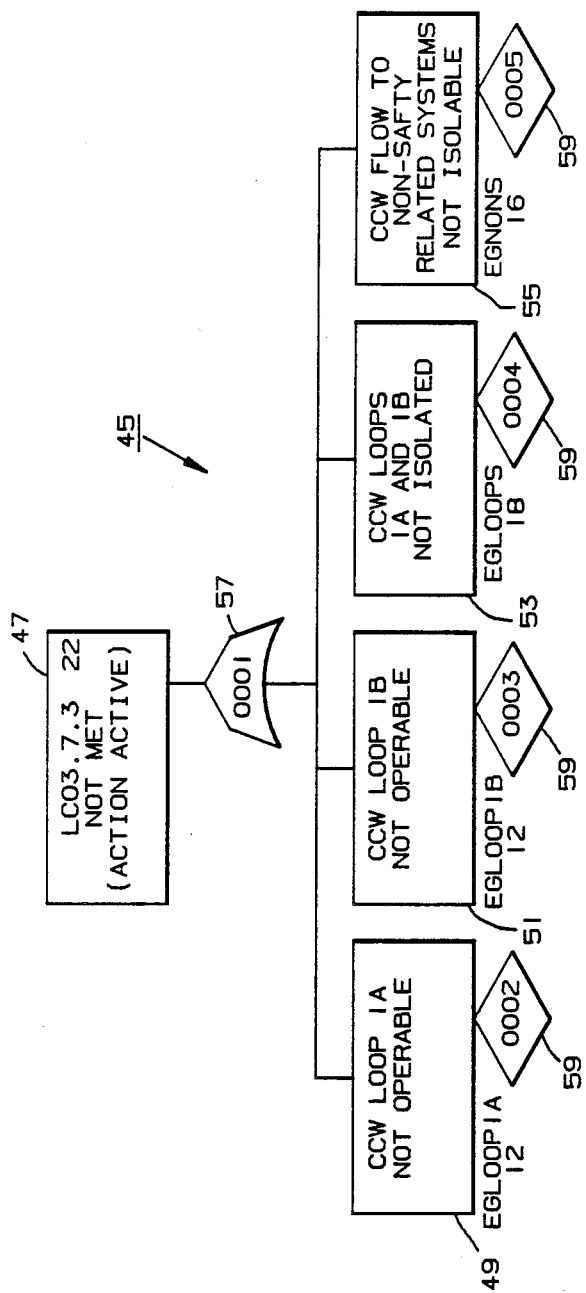

FIG. 4 illustrates the operability tree 45 for LCO 3.7.3. which requires the following:

LCO 3.7.3 At least two independent component cooling water loops shall be OPERABLE.

This LCO which is the top event 47 of the tree 45, is activated by any one of four events 49, 51, 53 and 55 in the component cooling water system (CCW) which are connected by OR gate 57. Again all of these events are developed in lower trees as represented by the "diamond" symbols 59. The status "16" of event 55 is NOT ISOLATABLE.

Figure 5:
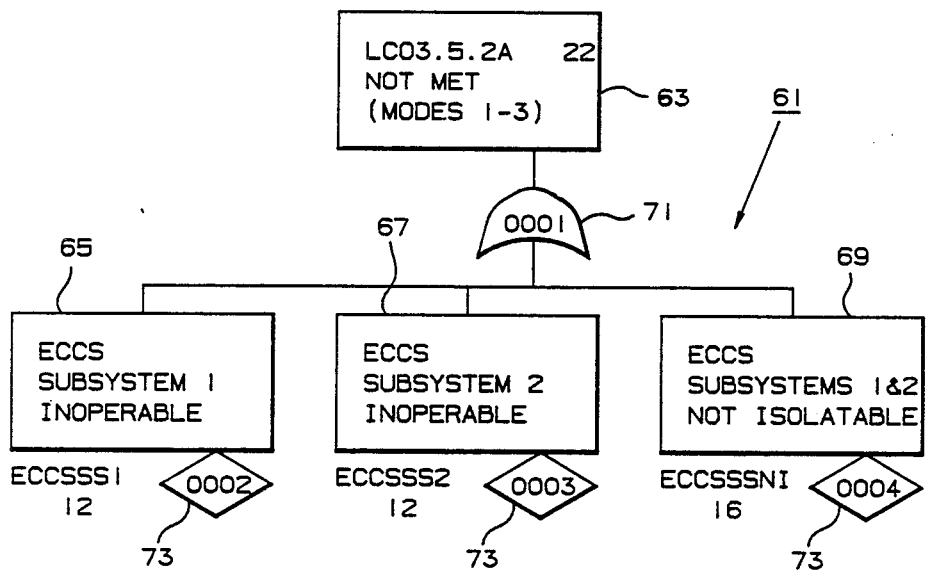

FIG. 5 illustrates the operability tree 61 for LCO 3.52A. This LCO establishes the following requirements.

LCO 3.5.2A Two independent Emergency Core Cooling System (ECCS) subsystems shall be OPERABLE with each subsystem comprised of:
 a. One OPERABLE centrifugal charging pump,
 b. One OPERABLE Safety Injection pump,
 c. One OPERABLE RHR heat exchanger,
 d. One OPERABLE RHR pump, and
 e. An OPERABLE flow path capable of taking suction from the refueling water storage tank on a Safety Injection signal and automatically transferring suction to the containment sump during the recirculation phase of operation.

ACTION:
 a. With one ECCS subsystem inoperable, restore the inoperable subsystem to OPERABLE status within 72 hours or be in a least HOT STANDBY within the next 6 hours and in HOT SHUTDOWN within the following 6 hours.

As the top event in tree 71, LCO 3.5.2A identified by reference character 63 in FIG. 5, is activated by any one of these events 65, 67 or 69 connected by OR gate 71. Each of these events are also developed in other trees as indicated by the "diamond" symbols 73.

Figure 6:
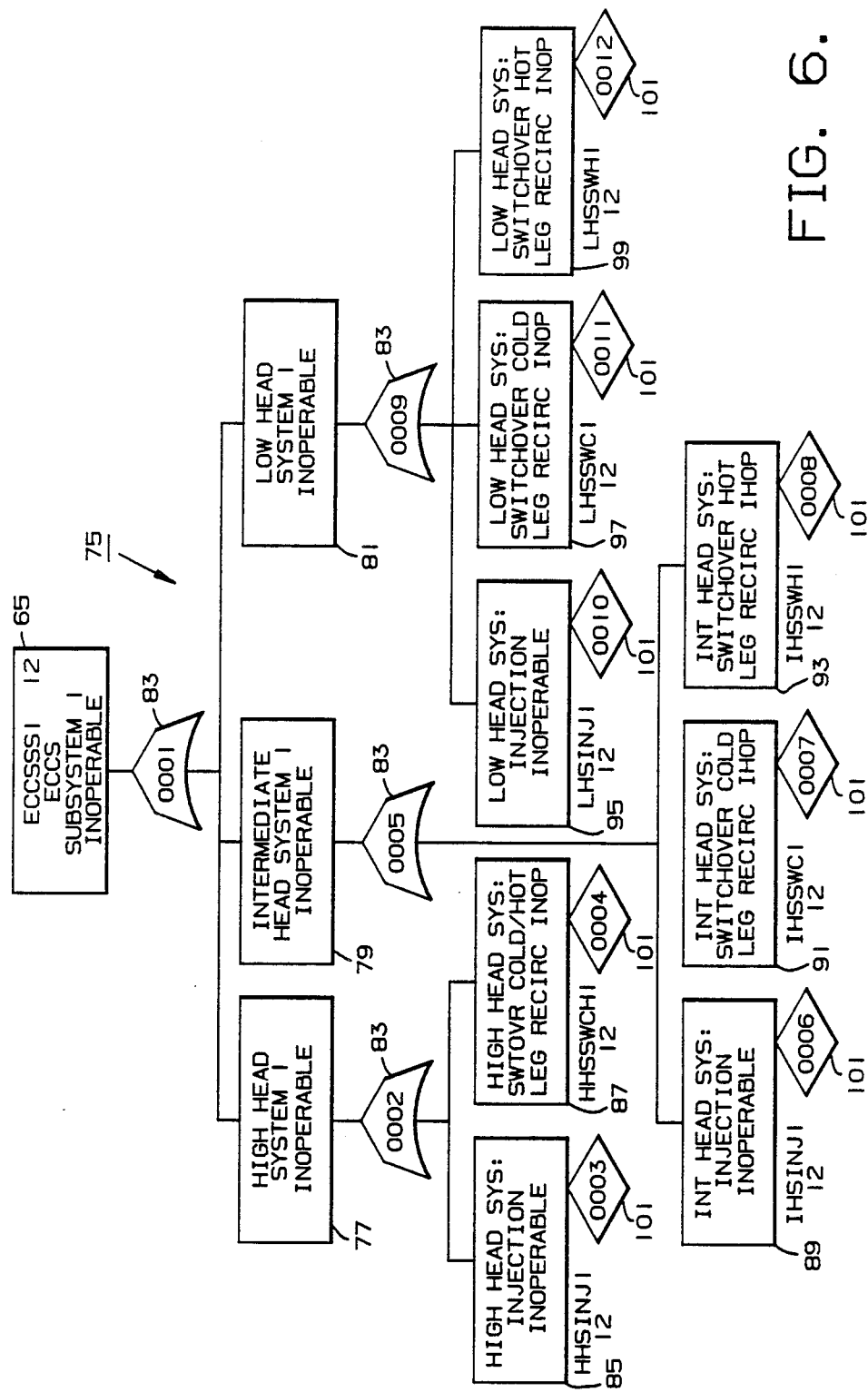

FIG. 6 illustrates the tree 75 for developing the event 65 in the tree 61 of FIG. 5. The top event here is Emergency Core Cooling Subsystem 1 INOPERABLE. This event is activated by the occurrence of any one of three events 77, 79 or 81 connected by OR gate 83. In turn, event 77 is activated by either event 85 or 87, while event 79 is activated by either event 89, 91 or 93, and event 81 is activated by event 95, 97 or 99. Thus, the top event 65 is activated by any one of the bottom events, each of which is developed in another tree as indicated by the "diamond" symbols 101.

Each of the paths by which the top event in each of the trees of FIGS. 2-6 can be activated is a cutset. A cutset may involve a single event or multiple events. If all of the gates from an event at the bottom of the tree to the top are OR gates, so that that event alone can activate the top event, such an event constitutes a single event cutset. Any path through the three which at any point requires the occurrence of two or more events, as indicated by an AND gate, defines a multiple event cutset.

The cutsets for each tree may be represented by a listing of each bottom event, or combination of bottom events, together with the status of that bottom event which activates the top event. Thus, the cutsets for the tree 19 of FIG. 2 are as follows:

TABLE I

| Cutsets for LCO 3.7.4 | 22 | |
|---|---|---|
| 1. | EFLOOPNI | 18 |
| 2. | EFLOOP1B | 12 |
| 3. | EFLOOP1A | 12 |

The tree 33 of FIG. 3 has only one, multiple member cutset as follows:

TABLE II

| Cutsets for EFLOOPNI 18 | | | |
|---|---|---|---|
| 1. | EFV093 | 06 | EFV094 06. |

Similarly, the cutsets for trees 45, 61, and 75 shown FIGS. 4, 5, and 6 respectively are as follows:

TABLE III

| Cutsets for LC03.7.3 | 22 | |
|---|---|---|
| 1. | EGNONS | 16 |
| 2. | EGLOOPS | 18 |
| 3. | EGLOOP1B | 12 |
| 4. | EGLOOP1A | 12 |

TABLE IV

| Cutsets for LC03.5.2A | 22 | |
|---|---|---|
| 1. | ECCSSNI | 16 |
| 2. | ECCSSS2 | 12 |
| 3. | ECCSSS1 | 12 |

TABLE V

| Cutsets for ECCSSS1 | 12 | |
|---|---|---|
| 1. | LHSSWH1 | 12 |
| 2. | LHSSWC1 | 12 |
| 3. | LHSINJ1 | 12 |
| 4. | IHSSWH1 | 12 |
| 5. | IHSSWC1 | 12 |
| 6. | IHSINJ1 | 12 |
| 7. | HHSSWCH1 | 12 |
| 8. | HHSINJ1 | 12 |

As mentioned previously, the "diamond" symbols in each of the illustrated trees indicate that the lower events are developed in other trees. Each of these additional trees is carried down to the component level as is the simple tree of FIG. 3. However, the additional trees for the bottom events in the trees illustrated involve many components and subsystems and accordingly have not been reproduced here. However, the listing of the cutsets for some of these additional trees will illustrate their complexity and the interaction between LCOs.

For instance, the tree which develops event 49 in FIG. 4, CCW Loop 1A NOT OPERABLE has the following 53 cutsets some of which are multiple event cutsets requiring 2 or 3 events to render CCW Loop 1A NOT OPERABLE.

TABLE VI

Cutsets for EGLOOP1A  12

| | | | | | |
|---|---|---|---|---|---|
| 1. | EGHV53 | 04 | | | |
| 2. | EGVO35 | 05 | | | |
| 3. | EEG01A | 02 | | | |
| 4. | EGV019 | 05 | | | |
| 5. | EFLOOP1A | 12 | | | |
| 6. | EFV058 | 05 | | | |
| 7. | EFHV51 | 03 | | | |
| 8. | GLV013 | 05 | | | |
| 9. | EFV057 | 05 | | | |
| 10. | EFV056 | 05 | | | |
| 11. | SGL11A | 02 | | | |
| 12. | NG03CDF2 | 06 | | | |
| 13. | NG03 | 02 | | | |
| 14. | NG0306 | 06 | | | |
| 15. | NG03C | 02 | | | |
| 16. | NB01 | 02 | | | |
| 17. | EGV305 | 02 | | | |
| 18. | EGV159 | 02 | | | |
| 19. | TEG01A | 02 | | | |
| 20. | EGLSLL1 | 02 | | | |
| 21. | EGV167 | 05 | | | |
| 22. | EGV162 | 05 | | | |
| 23. | TEG01A | LVPM050 | | | |
| 24. | EGV130 | 02 | EGHV15 | 04 | |
| 25. | EGHV53 | 06 | NG03CJF3 | 06 | |
| 26. | EFHV51 | 05 | NG03CMF1 | 06 | |
| 27. | EGV004 | 05 | EGV008 | 05 | |
| 28. | EGV004 | 05 | EGV007 | 02 | |
| 29. | EGV004 | 05 | EGV135 | 05 | |
| 30. | EGV004 | 05 | NB0108 | 02 | |
| 31. | EGV004 | 05 | PEG01C | 02 | |
| 32. | EGV003 | 02 | EGV008 | 05 | |
| 33. | EGV003 | 02 | EGV007 | 02 | |
| 34. | EGV003 | 02 | EGV135 | 05 | |
| 35. | EGV003 | 02 | NB0108 | 02 | |
| 36. | EGV003 | 02 | PEG01C | 02 | |
| 37. | EGV132 | 05 | EGV008 | 05 | |
| 38. | EGV132 | 05 | EGV007 | 02 | |
| 39. | EGV132 | 05 | EGV135 | 05 | |
| 40. | EGV132 | 05 | NB0108 | 02 | |
| 41. | EGV132 | 05 | PEG01C | 02 | |
| 42. | NB0107 | 02 | EGV008 | 05 | |
| 43. | NB0107 | 02 | EGV007 | 02 | |
| 44. | NB0107 | 02 | EGV135 | 05 | |
| 45. | NB0107 | 02 | NB0108 | 02 | |
| 46. | NB0107 | 02 | PEG01C | 02 | |
| 47. | PEG01A | 02 | EGV008 | 05 | |
| 48. | PEG01A | 02 | EGV007 | 02 | |
| 49. | PEG01A | 02 | EGV135 | 05 | |
| 50. | PEG01A | 02 | NB0108 | 02 | |
| 51. | PEG01A | 02 | PEG01C | 02 | |
| 52. | EGV130 | 02 | EGHV15 | 06 NG03CHF3 | 06 |
| 53. | EGV205 | 04 | EGTV29 | 04 EGV206 | 04 |

Similarly, the tree which develops event 89, Intermediate Head System Injection INOPERABLE in FIG. 6, contains the following 63 single and multiple event cutsets:

TABLE VII

Cutsets for IHSINJ1  12

| | | | | | | |
|---|---|---|---|---|---|---|
| 1. | EM8853A | 02 | | | | |
| 2. | EM8858A | 02 | | | | |
| 3. | EM8851 | 02 | | | | |
| 4. | EMHV8807B | 04 | | | | |
| 5. | EMHV8807B | 06 | | | | |
| 6. | EMHV8807A | 04 | | | | |
| 7. | EMHV8807A | 06 | | | | |
| 8. | EG01BGR3 | 05 | | | | |
| 9. | EMHV8802A | 04 | | | | |
| 10. | EMHV8802A | 06 | | | | |
| 11. | BB8948D | 02 | | | | |
| 12. | BB8948C | 02 | | | | |
| 13. | BB8948B | 02 | | | | |
| 14. | BB8948A | 02 | | | | |
| 15. | EPV040 | 02 | | | | |
| 16. | EPV030 | 02 | | | | |
| 17. | EPV020 | 02 | | | | |
| 18. | EPV010 | 02 | | | | |
| 19. | EM8921A | 05 | | | | |
| 20. | EM8922A | 02 | | | | |
| 21. | EM8926A | 02 | | | | |
| 22. | EMV098 | 05 | | | | |
| 23. | EMV097 | 05 | | | | |
| 24. | EMV096 | 05 | | | | |
| 25. | EMV095 | 05 | | | | |
| 26. | NG02BCR3 | 05 | | | | |
| 27. | EMHV8835 | 03 | | | | |
| 28. | EMHV8835 | 05 | | | | |
| 29. | EMHV8821A | 03 | | | | |
| 30. | EMHV8821A | 05 | | | | |
| 31. | EMHV8923A | 03 | | | | |
| 32. | EMHV8923A | 05 | | | | |
| 33. | NB01 | 02 | | | | |
| 34. | NB0103 | 02 | | | | |
| 35. | PEM01A | 02 | | | | |
| 36. | EFL00P1A | 12 | | | | |
| 37. | EFV033 | 05 | | | | |
| 38. | EFV032 | 05 | | | | |
| 39. | GLV009 | 05 | | | | |
| 40. | DSGL09A | 02 | | | | |
| 41. | NG01 | 02 | | | | |
| 42. | NG0106 | 06 | | | | |
| 43. | NG01A | 02 | | | | |
| 44. | NG01ABF3 | 06 | | | | |
| 45. | EMHV8814A | 03 | | | | |
| 46. | EMV005 | 02 | | | | |
| 47. | EMHV8814A | 05 | | | | |
| 48. | NG02AFF5 | 05 | | | | |
| 49. | BNHV8813 | 03 | | | | |
| 50. | BNHV8813 | 05 | | | | |
| 51. | EGL00P1A | 12 | | | | |
| 52. | EMV099 | 05 | | | | |
| 53. | EGV043 | 05 | | | | |
| 54. | EGV040 | 05 | | | | |
| 55. | EGV038 | 05 | | | | |
| 56. | BHV8806A | 03 | | | | |
| 57. | BNHV8806A | 05 | | | | |
| 58. | BNV011 | 05 | | | | |
| 59. | EMHV8888 | 04 | EPHV8878D | 04 | | |
| 60. | EMHV8888 | 04 | EPHV8878C | 04 | | |
| 61. | EMHV8888 | 04 | EPHV8878B | 04 | | |
| 62. | EMHV8888 | 04 | EPHV8878A | 04 | | |
| 63. | EMHV8823 | 04 | EMHV8871 | 04 | EMHV8964 | 04 |

It should be noted that the cutsets only include the bottom events or combinations of bottom events in a tree which activate the top event. The intermediate events in a multi-leveled tree, such as events 77, 79 and 81 shown in FIG. 6 do not appear. Hence, if the tree for developing the event 89 were to be added to the tree of FIG. 6, cutset #3 in Table V would be replaced by all of the 63 cutsets in Table VII. In designing the tree therefore, one must determine to what component level the trees are to be carried down, and what intermediate system the user of the system will want operability information about.

The above example can be used to demonstrate one of the more complicated aspects of the data, and that is, the impact of "cascading" tech specs. In the cascading tech spec situation, a system in one tech spec requires that a system in another tech spec be operable. In this particular example, the Essential Service Water Loop 1A, event 21 in the tree of FIG. 2, identified by the symbol EFL00P1A, which is made NOT OPERABLE by any one of 37 different events (not shown for the sake of brevity) can activate both LCO 3.7.4 by cutset #3 in Table I and Component Cooling Water Loop 1A, event 49 in FIG. 4 having identifier EGL00P1A, through cutset #5 in Table VI. Component Cooling Water Loop 1A will then active LCO 3,7.3., the top event in the tree 45 of FIG. 4, through cutset #4 in Table III, and the Intermediate Head Injection System 1, event 89 in FIG. 6 through cutset #51 in Table VII. The Intermediate Head Injection System, with identifier IHSINJ1, will in turn activate the Emergency Core Cooling System Subsystem 1, the top event in tree 75 of FIG. 6 with identifier ECCSSS1, through cutset #6 in Table V. ECCSSS1 will, finally, activate LCO 3.5.2A at the top of tree 61 in FIG. 5, through cutset #3 in Table IV.

This example provides some indication of the complexities of determining the affects of the inoperability of a component or system on the various LCOs. However, it shows only a small part of the numerous trees required for a plant which has in the neighborhood of 100 Tech Specs. The current system that has been developed has over 13,000 cutsets. The difficulty of the task lies in being able to manage such a large volume of data to generate reliable, meaningful information in a reasonable period of time. This is accomplished in accordance with one aspect of the invention through novel data base management techniques.

The Data base and Software

A. Data base Description

The results of the Operability Trees are loaded into a data base which the computer software accesses at the command of the user. The data base for the equipment and systems in the LCO Compliance Checking Function (excluding parameters) includes the following four tables:

(a) CUTSET Table—contains all of the results from the Operability Trees.
(b) CEVAL Table—contains a counter for each top even that requires more than one lower level simultaneous event to activate it.
(c) FIDTB Table—contains the status and date/time for each piece of equipment modeled in the Operability Trees.
(d) TESTAT Table—contains the status and data/time for each top event modeled in the Operability Trees.

Each of these tables will be described in more detail. There are some additional tables which contain supplementary information which directly support these four tables, but their details are not necessary for an understanding of the invention.

The CUTSET Table is a static table which is comprised of six attributes. The full cutset table includes a separate entry for each cutset and additional entries for each event in each multiple event cutset. However, the following example of a cutset table only includes selected cutset entries from the above examples which are useful in explaining the principals of the invention:

TABLE VIII

| | | CUTSET TABLE | | | |
|---|---|---|---|---|---|
| FID | TPEVNT | CUTS | TPSTAT | STATE | CTYPE |
| EFL00PN1 | LC03.7.4 | 1 | 22 | 18 | 0 |
| EFL00P1B | LC03.7.4 | 2 | 22 | 12 | 0 |

TABLE VIII-continued

| | | CUTSET TABLE | | | |
|---|---|---|---|---|---|
| FID | TPEVNT | CUTS | TPSTAT | STATE | CTYPE |
| EFL00P1A | LC03.7.4 | 3 | 22 | 12 | 0 |
| EFV093 | EFL00PN1 | 1 | 18 | 06 | 1 |
| EFV094 | EFL00PN1 | 1 | 18 | 06 | 1 |
| EFL00P1A | EGL00P1A | 5 | 12 | 12 | 0 |
| EGL00P1A | LC03.7.3. | 4 | 22 | 12 | 0 |
| EGL00P1A | IHSINJ1 | 51 | 12 | 12 | 0 |
| IHSINJ1 | ECCSSS1 | 6 | 12 | 12 | 0 |
| ECCSSS1 | LC03.5.2A | 3 | 12 | 22 | 0 |

The FID attribute is the Feature IDentifier for the component intermediate system or LCO. It is also referred to as the event attribute.

The TPEVNT attribute represents the top level event in the operability tree and is located indirectly "above" the FID. The FID can activate the TPEVENT if the STATE attribute is equal to the state that was input by the user and if CTYPE is equal to 0.

The CUTS attribute is the sequential number of the cutset for a particular top level event.

The STATE attribute is the status of the FID that will cause the top level event (TPEVNT) to occur.

The TPSTATE attribute is the status of the top level event when activated by the cutset.

The CTYPE attributes identifies if the FID is a member of a single-element or multiple-element cutset. If the FID is a single member cutset, the CTYPE=0; and if the FID is one member of a multiple-member cutset, the CTYPE=1. If the CTYPE=1, the software will access the CEVAL table to determine if the top-level event associated with the FID has been activated.

The Cutset EVALuation table is a dynamic table which provides a compliation of all of the top level events which have multiple event cutsets and how many of the members have been activated. The attributes of the CEVAL Table which are relevant to an explanation of the invention are shown in the following exemplary table:

TABLE IX

| | CEVAL TABLE | | | |
|---|---|---|---|---|
| MEVENT | CNT | SETCNT | EV1 | EV2 |
| EFLOOPNl,1,18 | 1 | 2 | EFV093 | |

The MEVENT attribute is a combination of the TPEVNT, CUTS and STATE attribute from the CUTSET table.

The CNT attribute is the counter of the number of multiple member cutsets that have been activated for either real or hypothetical inputs. The SETCNT attribute is the static counter of the number of cutsets that need to be activated to activate the element contained in the MEVENT attribute.

The EV1 and EV2 attributes contain the members of the multiple event cutsets that have been activated including the FID and the STATE of the FID.

The CEVAL Table also includes other attributes such as a counter which keeps track of hypothetical inputs and resets the CNT attribute when the hypothetical inputs are removed. It can also include counters which keep track the number of times each of the events EV1 et cetera have been activated.

The FID TaBle contains both static and dynamic information related to each component that was modeled in the operability trees and includes the following attributes:

TABLE X

| FIDTB Table | |
|---|---|
| FID | EFV093 |
| LCTYPE | 1 |
| Name | ISOLATION VALVE |
| LSTATE | 06 |
| LDATE | MM/DD/YY |
| LTIME | HHiMM |
| PNUMB | EF-V-0093 |
| TGCTR | 0 |

The FID attributes which is static is, as noted above, the identifier.

The LCTYPE which is also static is the type of component. In this case, the valve is type 1.

The NAME attribute, which is static, is the name of the component for display on the various screens.

The LSTATE attribute which is dynamic, is the numerical representation of the status of the component that was entered. In the example, the valve is IN SERVICE OPEN.

The LDATE and LTIME attributes which are dynamic, are the data and time respectively that the status was last changed.

The PNUMB attribute which is static, is the Plant number for the component which is entered by the user and used on the display.

The TGCTR attribute, which is dynamic, is a counter that indicates how many tag out orders are currently active for the component. Tag out orders require that a component which is out of service is physically tagged. The zero TGCTR in the example indicates that there are no current tagout orders currently active for the valve.

The Top-level Event STATus table is a dynamic table which provides the current status of all of the top-level events for all of the LCO/Actions and is comprised of the following attributes:

TABLE XI

| TESTAT Table | | | |
|---|---|---|---|
| TPEVNT | 3.7.3 | EFLOOPN1 | |
| TPSTAT | 22 | 18 | |
| TEDATE | Mo.Da.Yr. | | Mo.Da.Yr. |
| TETIME | Hr.Min.Sec. | Hr.Min.Sec. | |
| CUTS | 4 | | 999 |
| SURNIP | | | |
| TECNTR | 1 | 1 | |

The TPEVNT attribute is equivalent to the Feature IDentifier, but for the top level event.

The TPSTAT attribute is the numerical representation of the status of the top level event.

The TEDATE and TETIME attributes are the data and time respectively that the status of the top-level event was changed.

The CUTS attribute is the number of the cutset which made the top-level event "active". If the top level event is not active, this attribute contains a zero. If the top-level event was removed from service directly by the user through the Data Input Screen for systems, there will be no cutset number, but 999 will be entered.

The SURNIP attribute is the number of the surveillance or task that activated at LCO/Action through a Surveillance-Initiated LCO function.

The TECNTR attribute is a counter which records how many times a particular event has been activated by the same lower-level event.

B. Software Description

Figure 7A:
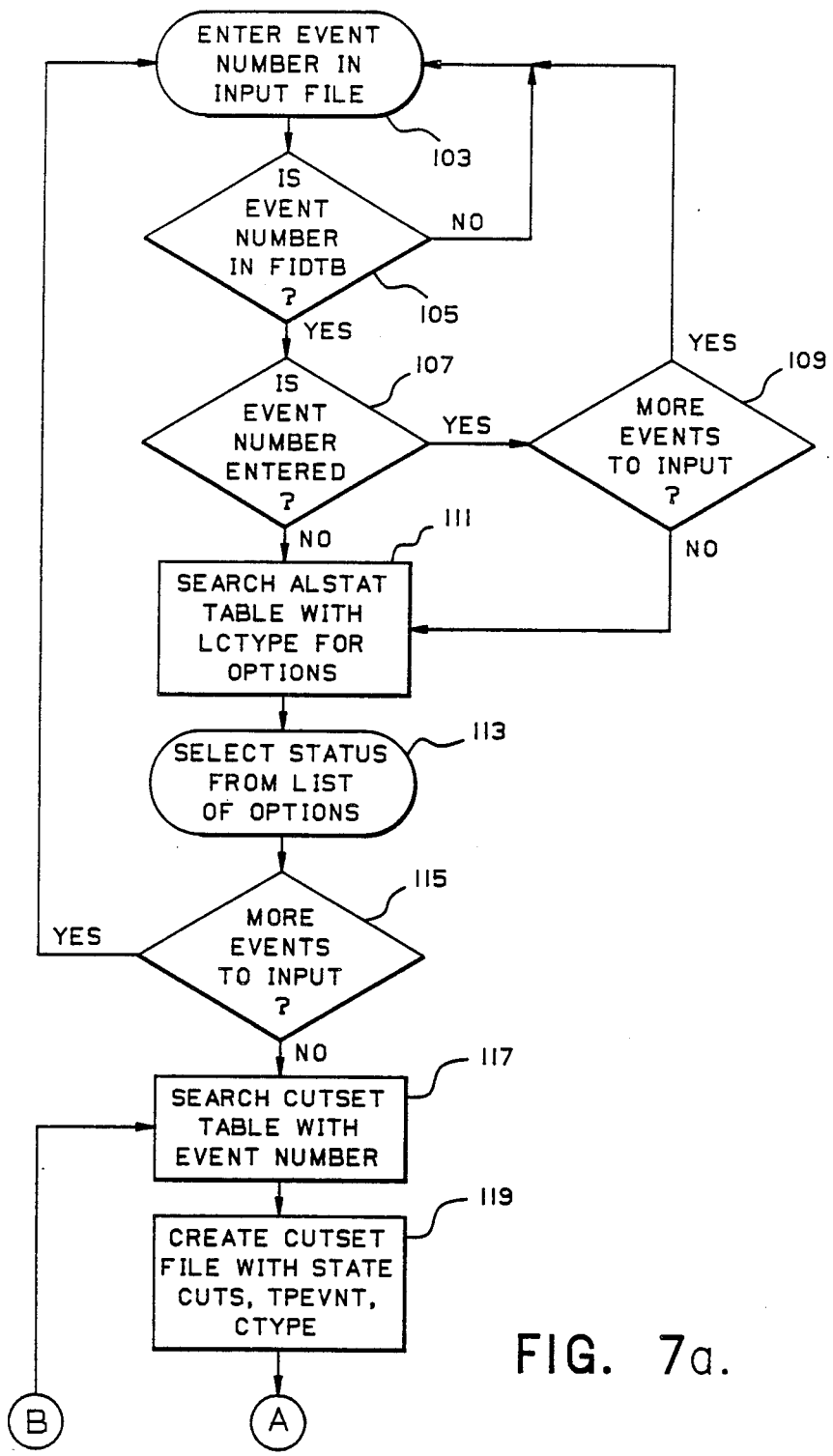
FIGS. 7a, 7b and 7c when laid end to end illustrate the flowchart for determining compliance of the nuclear power plant of FIG. 1 with the technical specifications embodied in the operability trees of FIGS. 2 through 6.
Figure 7B:
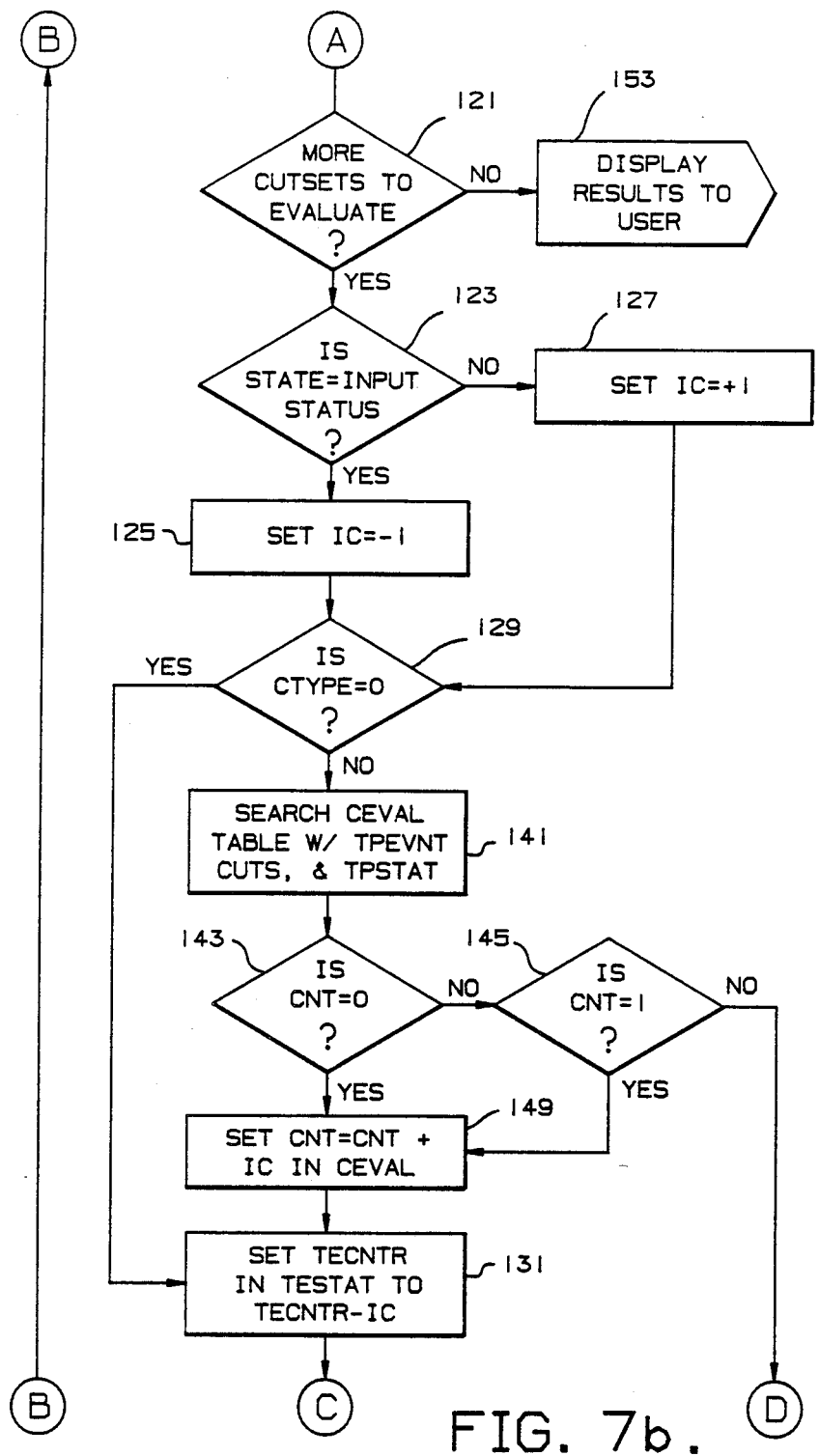
Figure 7C:
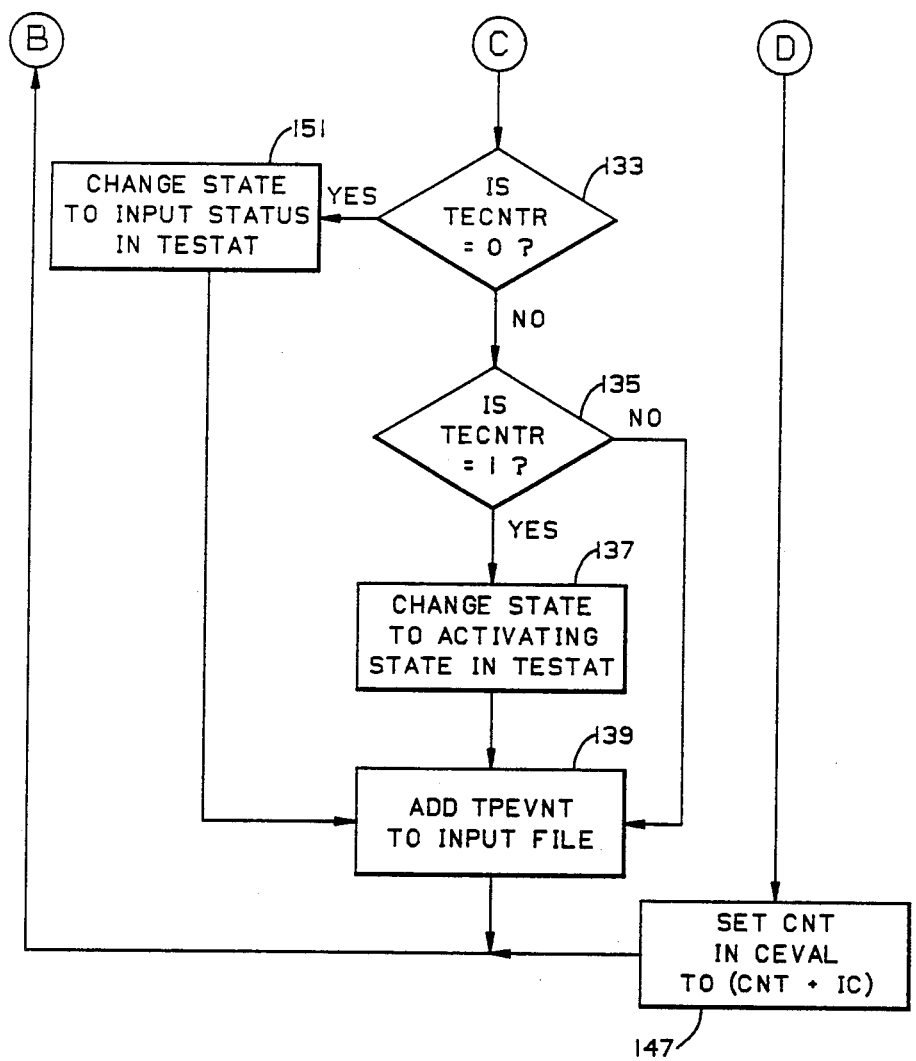
Figure 8:
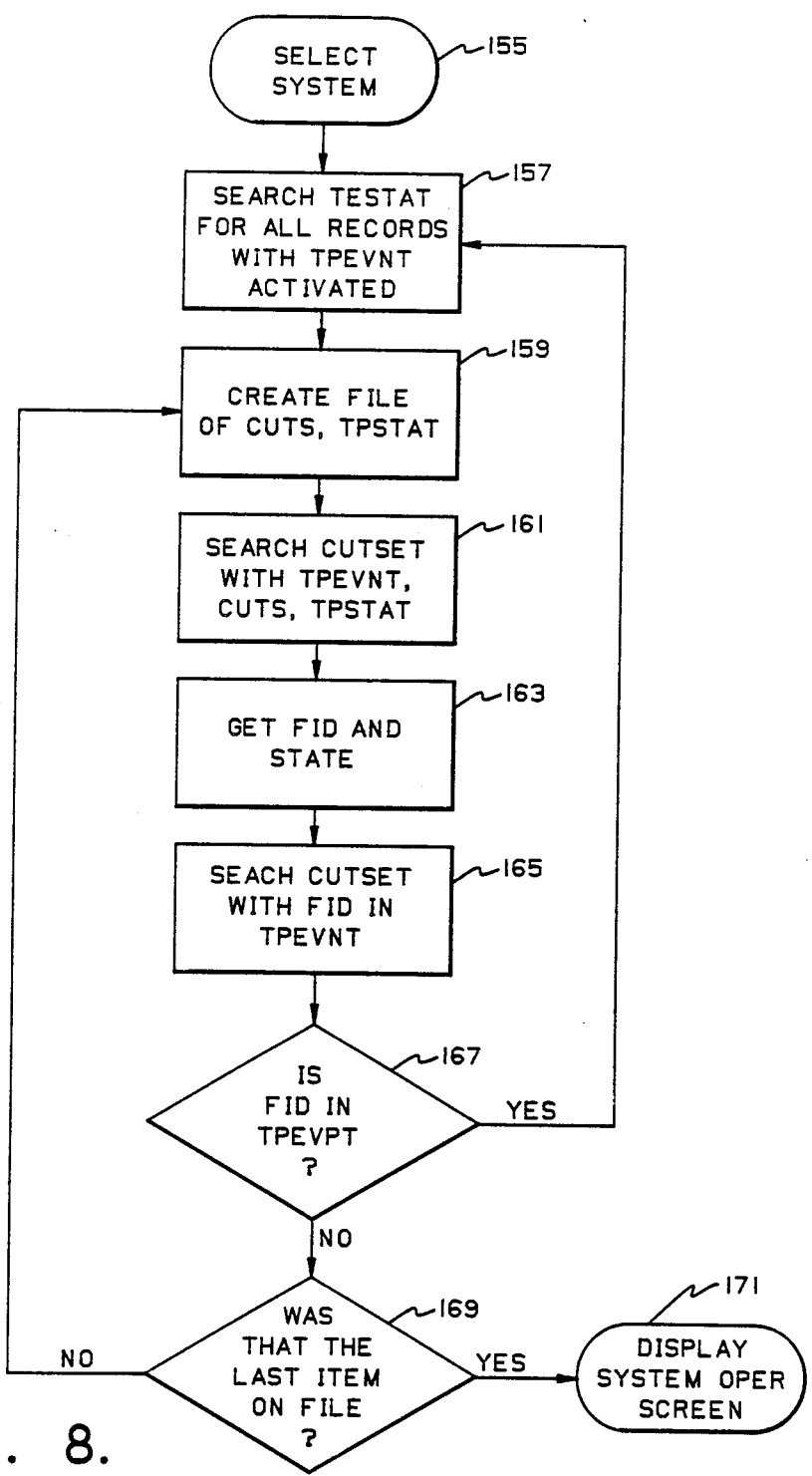
FIG. 8 is a flowchart for determining the events which are responsible for non-compliance with the technical specifications.
Figure 12:
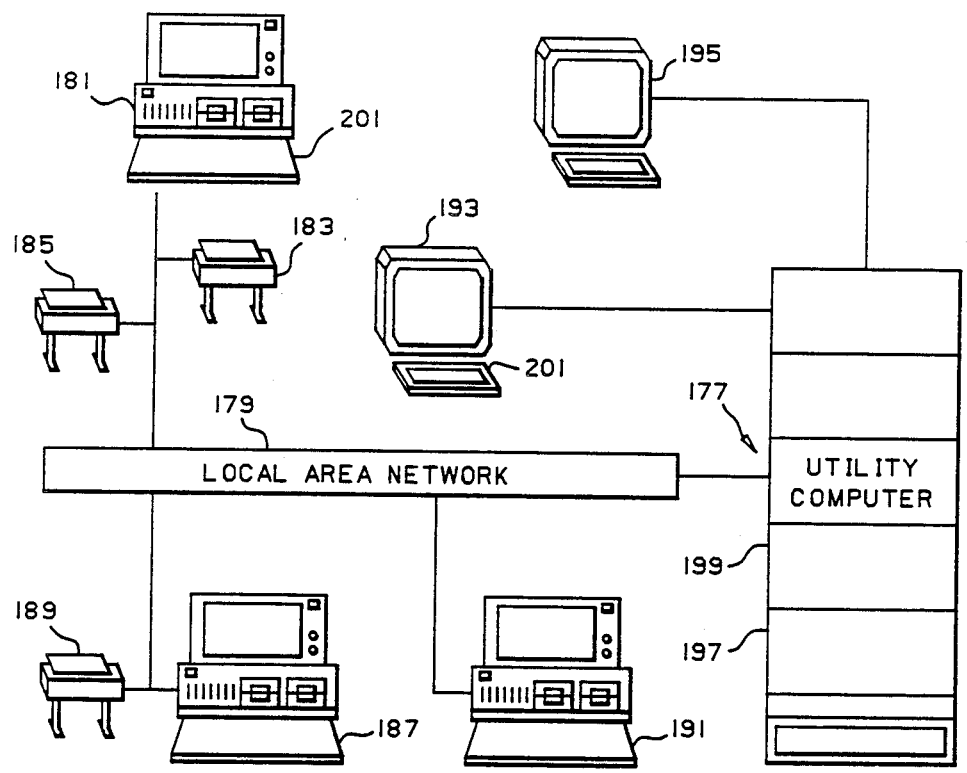
FIG. 12 is a schematic diagram of a computer system suitable for implementing the invention.

The process of evaluating whether an event as input by the user impacts an LCO is outlined in the flowcharts of FIGS. 7a, 7b and 8. The user initiates an evaluation by entering at 103 an event number which is checked at 105 to determine if it is in the FIDTB (Table X). As previously described, this event number can represent a piece of equipment, a system or a parameter. If the event number is in the table, meaning the event has been modeled in the Operability Trees, a check is made to determine if it has already been entered 107. If the event has previously been entered, additional events are entered through 109. For events being entered for the first time, a search is made at 111 of an ALSTAT Table (not shown) which lists by event type the status options available. These options are then displayed to the user who selects at 113 the appropriate status for the event. The status of previously entered events can be changed in a similar manner through 109.

After all of the inputs have been made 115, the LCO compliance and system operability evaluation is made by first searching the cutset table 117 with the event number of an input and creating a file 119 containing the event number, state, cutset number, top event and C type attributes of all impacted cutsets for evaluation. For each cutset to be evaluated 121, the state attribute, indicating the status of the event which will activate the associated top event, is compared at 123 with the input status. If the input status equals the state, a flag IC is set to "−1" at 125, otherwise, it is set to "+1" at 127. In either case, the C type attribute is checked at 129.

If the C type attribute is zero, indicating a single event cutset, the top event counter, TECNTR, in the top event table, TESTAT (Table XI) is set to the count minus IC at 131. This increments the counter by one for a cutset which activates its top event (where IC= −1). Thus, this TECNTR attribute keeps track of the number of ways in which a top event has been activated.

If the TECNTR attribute does not equal zero 133, but is equal to "1", 135, indicating that this top event has just been activated for the first time by the cutset being evaluated, the top event STATUS attribute is set to the activated state at 137. The top event is then added to the input file at 139 as an event. If the TECNTR attribute is equal to more than 1 at 135, indicating that this top event has already been activated through another path, the top event is added directly to the input file at 139. The top event is entered into the input file in each instance so that the TECNTR attributes for other top events further up the tree will be incremented also.

With the top event added to the input file at 139, the program loops back and searches the cutset table at 117 using the top event of the previous cutset as the event for the current cutset. In this manner, progress is made up through the hierarchy of the trees until the top event of a cutset can no longer be found in the cutset table. Such a top event is an ultimate activated top event representing an LCO, which as will be seen, is displayed to the user.

If the C type attribute of a cutset is not equal to zero at 129, indicating that it is a number of a multiple event cutset, the CEVAL Table (Table IX) is searched 141 using the TPEVENT, CUTS and TPSTAT attributes derived from the CUTSET Table (Table VIII) as the MEVENT attribute. If the count attribute, CNT, for that MEVENT is not zero 143, indicating that all of the members of the multiple event cutset have not yet been activated, and is not equal to "1" at 145, indicating that more than one member of the multiple event cutset has not been activated, the CNT attribute is set equal to CNT+IC at 147. Since IC equals −1 for an activated cutset, the effect is to reduce CNT by one. After the count attribute is set, the program loops back to evaluate the next cutset at 117.

As can be seen from the preceding discussion, as each event in a multiple event cutset is activated, the CNT attribute is decreased by one. When CNT equals one at 145, the cutset then being evaluated is associated with the last event of the multiple event cutset to be activated. Thus, when IC is added to CNT at 149, the count becomes zero indicting that all of the multiple events of the multiple event have been activated, thereby activating the associated top event.

As in the case of single event cutsets, activation of the top event in a multiple event cutset increments the top event counter TECNTR for that event at 131, the status of the top event is set to the activated state in the TESTAT Table at 137 as appropriate, and the top event is added to the input file at 139.

Provision is also made for removing an event from the system if it is returned to service. The return to service is entered by inputting the appropriate new status at 111. At this new status will not equal the state which activates the top event when checked at 123, IC will be set to +1 at 127. For multiple event cutsets, which have been activated so that CNT+0 at 143, the count will be incremented to +1 at 149 thus indicating that the multiple event cutset is no longer activated. For both multiple event cutsets and single event cutsets, deactivation of the top event decrements the TECNTR by 1 at 131. If there are no other paths remaining by which the top event is activated so that TECNTR equals zero at 133, the top event status is set to the inactivated state at 151. This top event is added to the input file at 139 so that the TECNTRs for higher level top events may be similarly drecremented.

The results of the evaluation are presented to the user at 153 on a computer display screen. An example of a results screen is shown in FIG. 9. This screen 155 in addition to providing identifying information across the top, lists the impacted LCOs, their statuses, the impacted systems, which are the events just below the LCOs in the operability trees which triggered the non-compliance, the statuses of these systems, and the impacted plant mode. In the example shown, an inoperable CCW Train A has resulted in LCO 3.7.3. being not met. With Train B also inoperable, a much more serious condition exists and LCO 3.7.3 is violated.

The results screen of FIG. 9 only identifies the impacted system. The invention also permits the user to determine what component or combination of components rendered the system inoperable. This is especially important for the next shift that takes over operation of the plant. FIG. 8 is a flowchart of the software which generates the required information. The user enters the impacted system at 155. The TESTAT Table (Table XI), is searched at 157 with the top event attribute, TPEVENT, and the top event attribute, TPSTAT, to find the cutset identifier attribute, CUTS, of all of the cutsets which activated the top event. The CUTS, and TPSTAT attributes for the top event are entered into a file at 159. The CUTSET Table (Table VIII) is then searched 161 using the CUTS, TPEVENT and TPSTAT attributes for an entry in this file to find the FID (event identifier) and the STATE attributes for the cutset, 163. The CUTSET table is then searched again at 165 using the FID and STATE attributes as the TPEVENT and TPSTAT attributes. If such an entry is found at 167 in the CUTSET Table, the program loops back to 157 to search the TESTAT Table for this next lower level top event and the process is repeated until a FID is not found as a TPEVENT in the cutset Table indicating that such a FID is an event at the bottom of the tree which initiated the non-compliance. If there are additional items in the file created at 159 as determined at 169, these additional items are tracked down to identify other components which also activated the LCO. When all such components have been found, a system operability screen is presented at 171 to the user. FIG. 10 illustrates an exemplary system operability screen 173 which shows that the CCW Train A was rendered NOT OPERABLE by hand control valve EG-HV-0053 which was OUT OF SERVICE CLS (closed).

Additional screens (not shown) are also available to the user such as an input screen which presents the status options available for the selected input event. The user also has the capability to view the actual tech spec text. Another screen which can be used in conjunction with the LCO text screen is the LCO Data screen which allows the user to view the status of all of the top level events which impact the LCO. An example of such a screen 175 is shown in FIG. 11 where it is indicated that LCO 3.7.3 is NOT MET because CCW Train A is NOT OPERABLE while CCW Train B which also impacts this LCO remains operable.

C. Hardware

The system can be implemented on many different hardware configurations, from a personal computer to a mainframe, according to the users needs. One of the most advantageous computer configurations consists of a Local Area Network (LAN) of microcomputers which interface with an on-site mini- or main frame computer 177. As shown in FIG. 13, the Local Area Network 179 can consist of a microcomputer 181 in the control room or shift supervisor's office with a report printer 183 and tag printer 185, another microcomputer 187 with a printer 189 in the engineering department and additional microcomputers 191 in other departments. In this way, the control room and other key users have immediate and continuous access to the tech spec appraisal system. The LAN tie to the mainframe computer 177 also provides access for planning/scheduling and maintenance personnel through terminals 193 and 195. The mainframe computer 177 includes in addition to a central processor 197 the data base 199 which may be accessed by the microcomputers. The users communicate with the system by inputting data through key pads 201 and receive information from the system through the video displays 203.

EXAMPLE

In order to illustrate the process by which the impact of an event on the LCOs is carried out by the invention, assume that the user enters user enters as an event that the isolation valve EFV093 is IN SERVICE OPEN (STATE=06). A search of the CUTSET Table (Table VIII) for an EFV093 FID with an 06 State shows that the CTYPE attribute for this cutset equals 1 indicating that it is a member for a multiple event cutset. The CEVAL Table (Table IX) is then searched using the TPEVENT attribute EFL00PN1, the CUTS attribute 1 and the TPSTATE attribute 18 from the CUTSET Table as the MEVENT. At this point the CNT attribute for this MEVENT will be two indicating the 2 events must occur to activate the MEVENT. The CNT attribute will be decremented by one to a count of one and EFV093 will be entered as the first event based upon the assumed input and the exemplary CEVAL Table will appear as shown in Table IX. Since all of the events in the multiple event cutset have not occurred there is no progression up the tree.

Assume, however, that the user now inputs the isolation valve EFV094 as IN SERVICE OPEN. Again the CUTSET Table is searched this time with EFV094 as the event or FID attribute with an 06 STATE and again the C type attribute is 1. This time when the CEVAL table is searched for MEVENT the CNT attribute is one which is reduced by the latest impact to zero indicating that all of the events in the multiple event cutset have been activated and the MEVENT has therefore been activated.

The CUTSET Table is then searched again using EFLOOPNI, which was the TPEVENT attribute for the multiple event cutset, as the FID attribute, and using the TPSTATE attribute 18 of the multiple event cutset as the STATE attribute. This search uncovers the first entry in the CUTSET Table which has a C type attribute of zero indicating it is a single event cutset which activates its top event LCO3.7.4. The CUTSET Table is then searched again using LCO3.7.4 as the FID or event. However, no such entries are found in the FID attributes indicating that LCO3.7.4 is an ultimate top event which has been activated. This result is then displayed to the user on the computer screen.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A machine implemented method of determining operating limitation compliance for a complex process plant having a plurality of interrelated components and systems, the method comprising the steps of:
    generating operability trees having cutsets representing various combinations of events associated with the state of operability of said components and systems and the status of said operating limitations, which cutsets taken separately and in sequence with other cutsets, result in an indication of noncompliance with said operating limitations;
    generating in a digital computer a data base including a cutset table which includes an event attribute for identifying each event associated with a cutset and a top level event attribute identifying a higher level event activated by the cutset;
    selecting a given event; and
    operating said digital computer to:
    (a) search the event attributes of said cutset table for the selected event to identify as activated all cutsets for which the selected event activates a top event as indicated by the top event attribute;
    (b) as to each such activated cutset, repeat step (a) using the associated activated top event attribute as the selected event;
    (c) repeating step (b) until the top level event activated by a cutset does not appear as an event attribute in the cutset table and identifying such top event as an ultimate activated top event; and
    (d) generate an output identifying each ultimate top event activated by said given event.

2. The method of claim 1 wherein said step of generating cutsets includes generating some multiple member cutsets requiring more than one event to activate the associated top event, wherein said step of generating said data base includes entering in the cutset table a separate entry for each event in each multiple event cutset, providing each entry in the cutset table with a cutset identifier attribute identifying the cutset with which it is associated, with each such entry for a multiple event cutset having a common cutset identifier attribute, and wherein said digital computer is operated to:
    (i) after step (a), search the identifier attributes in the cutset table for other entries having the same cutset identifier;
    (ii) determine whether the event attribute for any such other entries has been selected; and
    (iii) identify a multiple event cutset as activated only when all of the events for the multiple event cutset have been selected.

3. The method of claim 1 wherein the step of generating said data base includes entering in the cutset table a state attribute for each event which indicates the status of the event which will activate the associated top event, wherein the step of selecting a given event includes selecting an input status for such event and wherein said step (a) of identifying cutsets as activated includes comparing the input status for a selected event with the state attribute and identifying as activated only those cutsets for which the state attribute for the selected event equals the input status.

4. The method of claim 2 wherein the step of generating said data base includes providing each entry in the cutset table with a cutset type attribute having a first value for multiple event cutsets and a second value for single event cutsets, wherein said step (a) of searching the cutset table includes determining the value of the cutset type attribute and wherein steps i to iii are only carried out for entries in the cutset table having a cutset type attribute of the first value.

5. The method of claim 4 wherein said digital computer is operated to perform step ii by generating and evaluating a cutset evaluation table having an entry for each multiple event cutset including a multiple event identifier attribute identifying the multiple event cutset and a multiple event counter attribute which counts the number of events in said multiple event cutset which have been selected, and wherein said digital computer is operated to perform step iii by identifying a multiple event cutset as activated when said count attribute reaches a value indicating that all of the events associated with a multiple event cutset have been activated.

6. The method of claim 5 wherein said multiple event counter attribute for each multiple event cutset is initially set to the number of events in the multiple event cutset and is decremented by one each time an event in the cutset is selected as activated, and wherein the multiple event cutset is identified as activated when the associated multiple event counter reaches zero.

7. The method of claim 6 including the step of removing the identification of an event as selected when it is no longer activated, and for such events having a multiple event cutset type attribute, incrementing the associated multiple event counter attribute by one.

8. The method of claim 1 including the following steps for generating an indication of the events which resulted in activation of a top event:
selecting an activated top event; and
operating said digital computer to:
(1) search the cutset table to identify each cutset having as the top event attribute the selected activated top event;
(2) as to each identified cutset, repeat step 1 using as the selected activated top event the event attribute of the identified cutset;
(3) repeat step 2 until the top event attribute of an identified cutset does not appear as an event in the cutset table, and identify such an event; and
(4) generate an output identifying the identified events.

9. A machine implemented method of determining limiting conditions of operation compliance and system operability in a nuclear power plant having a number of interrelated components and systems, said method comprising the steps of:
generating operability trees having cutsets representing various combinations of events associated with the state of operability of said components and systems and the status of said limiting conditions of operation, which cutsets, taken separately and in sequence with other cutsets, result in indications of non-compliance with said operating limitations, and inoperability of said systems some of said cutsets being multiple event cutsets requiring more than one event to indicate non-compliance with a limiting condition of operation and inoperability of a system;
generating in a digital computer a data base including a cutset table having an entry for each cutset which includes an event identifier attribute, a top event identifier attribute identifying a higher level event activated by the cutset, a top event status attribute indicating the status of the top event when activated; an event status attribute indicating the status of the event required to activate the top event, a cutset type attribute identifying single event and multiple event cutsets, and a cutset identifier attribute, said cutset table including a separate entry for each event in a multiple event cutset with each such separate entry for a multiple event cutset having a common cutset identifier;
selecting a given status for a given event; and
operating the digital computer to:
(a) search the event attributes and event status attributes of the cutset table to identify cutsets in which the event status attribute matches the selected status for the selected event;
(b) determine the cutset type of each identified cutset from the cutset state attribute;
(c) as to each identified single event cutset repeat steps (a) and (b) using the top event attribute from the identified cutset as the event attribute;
(d) as to multiple event identified cutsets, generate a cutset evaluation table having an entry for each multiple event cutset which includes a top event identifier attribute for the multiple event cutset and a multiple event counter attribute which counts the number of events in said multiple event cutset which have been selected, identify a multiple event cutset as activated when said count attribute reaches a value indicating that all of the events associated with a multiple event cutset have been activated, and repeat the steps a, b and c using the top event identifier attribute of a multiple event cutset identified as activated as the event attribute;
(e) repeat the above steps until the top event activated by a cutset does not appear as an event attribute in the cutset table and identifying this activated top event as the top event in the associated operability tree; and
(f) generate an output identifying each top event in an operability tree activated by the given status of the given event.

10. The method of claim 9 wherein the multiple event counter in step (d) for a multiple event cutset is initially set to the number of events in the multiple event cutset and is decremented by one for each event in the multiple event cutset for which the event status attribute matches the selected status, and wherein a multiple event cutset is identified as activated when the associated multiple event counter reaches zero.

11. The method of claim 10 including the step of incrementing by one the multiple event count attribute of a multiple event cutset when the given status of a selected event which is one of the members of the multiple event cutset is changed from a status which matches the event status attribute to a status which does not match the event status attribute indicating that the event is no longer activated.

12. The method of claim 9 including the following steps for generating an output indicating the events which activated a top event:
selecting an activated top event; and
operating said digital computer to:
(1) generate in the data a top event status table including an entry for each cutset which activated a top event, each such entry having a top event attribute identifying the top event, a top event cutset identifier attribute identifying the cutset and a top event status attribute indicating the state of the activated top event;
(2) search said top event status table for the selected top event and generating a file containing the cutset identifier attribute and top event status attribute for all entries in the top event status table for the selected top event;
(3) for each entry in said file search the cutset table to identify an entry having the same top event attribute, cutset identifier and top event status as said file entry;
(4) repeat steps 2 and 3 using as the top event attribute in step 2 the event attribute of the entry previously identified in step 3;
(5) repeat step 4 until no more event attributes identified in step 3 appear as a top event attribute in the top event status table, and identify such events, and
(6) generate an output identifying the events identified in step 4.

13. In combination:
(A) a complex process plant having a plurality of interrelated components and systems;
(B) means for selecting an event representing the inoperability of at least one of said components and systems;
(C) a digital computer programmed to determine compliance of said complex process plant with a set of technical specifications and operability of certain of said systems and components; and including:

(1) means for storing a data base including a cutset table having an entry for each cutset in each of a plurality of operability trees, each cutset representing a different combination of events associated with the state of operability of said components and systems and the status of the technical specifications, which cutsets when taken separately and in sequence with other cutsets result in an indication of non-compliance with a technical specification or inoperability of a system, each said entry in the cutset table including an event attribute indicating the event which activates the cutset, and a top event attribute indicating the top event activated by that cutset; and (2) processing means responsive to said input means and including means for:
  (a) searching said cutset table to identify all entries in which the event attribute matches the selected event,
  (b) as to each such entry repeating (a) using the top event attribute of the identified entry of the cutset table as the selected event,
  (c) repeating (b) until the top event of each identified entry is not found in the cutset table; and
(D) means for displaying indications of such top events as activated top events at the top of an operability tree.

14. The combination of claim 13 wherein some top events require multiple selected events to be activated, wherein said means in the computer for storing a data base includes in the cutset table a cutset type attribute identifying multiple event cutsets and said data base including a cutset evaluation table containing entries for each of the multiple event cutsets including a count attribute indicating the number of members of the multiple event cutset which have been activated, and wherein said searching means in the processing means includes means for checking the cutset type attribute of each cutset associated with a selected event, and for multiple event cutsets, indexing said count attribute and repeating the search of the cutset table using the top event attribute of the multiple event cutsets as the selected event only when the count attribute has reached a count indicating that all of the events in the multiple event cutset have been selected.

15. A machine implemented method of determining activation of a top event in a decision tree comprising the steps of:
  generating cutsets representing the various combinations of events in the decision tree, which when taken separately and in sequence with other cutsets, result in activation of the top event;
  generating in a digital computer a data base including a cutset table which includes an event attribute for identifying each event associated with a cutset and a top level event attribute identifying a higher level event activated by the cutset;
  selecting a given event; and
  operating said digital computer to:
  (a) search the event attributes of said cutset table for the selected event to identify as activated all cutsets for which the selected event activates a top event as indicated by the top event attribute;
  (b) as to each such activated cutset, repeat step (a) using the associated activated top event attribute as the selected event;
  (c) repeating step (b) until the top level event activated by a cutset does not appear as an event attribute in the cutset table and identifying such top event as an ultimate activated top event; and
  (d) generate an output identifying each ultimate top event activated by said given event.

16. The method of claim 15 wherein said step of generating cutsets includes generating some multiple member cutsets requiring more than one event to activate the associated top event, wherein said step of generating said data base includes entering in the cutset table a separate entry for each event in each multiple event cutset, providing each entry in the cutset table with a cutset identifier attribute identifying the cutset with which it is associated, with each such entry for a multiple event cutset having a common cutset identifier attribute, and wherein said digital computer is operated to:
  (i) after step (a), search the identifier attributes in the cutset table for other entries having the same cutset identifier;
  (ii) determine whether the event attribute for any such other entries has been selected; and
  (iii) identify a multiple event cutset as activated only when all of the events for the multiple event cutset have been selected.

17. The method of claim 16 wherein the step of generating said data base includes providing each entry in the cutset table with a cutset type attribute having a first value for multiple event cutsets and a second value for single event cutsets, wherein said step (a) of searching the cutset table includes determining the value of the cutset type attribute and wherein steps i to iii are only carried out for entries in the cutset table having a cutset type attribute of the first value.

18. The method of claim 15 including the following steps for generating an indication of the events which resulted in activation of a top event:
  selecting an activated top event; and
  operating said digital computer to:
  (1) search the cutset table to identify each cutset having as the top event attribute the selected activated top event;
  (2) as to each identified cutset, repeat step 1 using as the selected activated top event the event attribute of the identified cutset;
  (3) repeat step 2 until the top event attribute of an identified cutset does not appear as an event in the cutset table, and identify such an event; and
  (4) generate an output identifying the identified events.

* * * * *